United States Patent Office 3,537,927
Patented Nov. 3, 1970

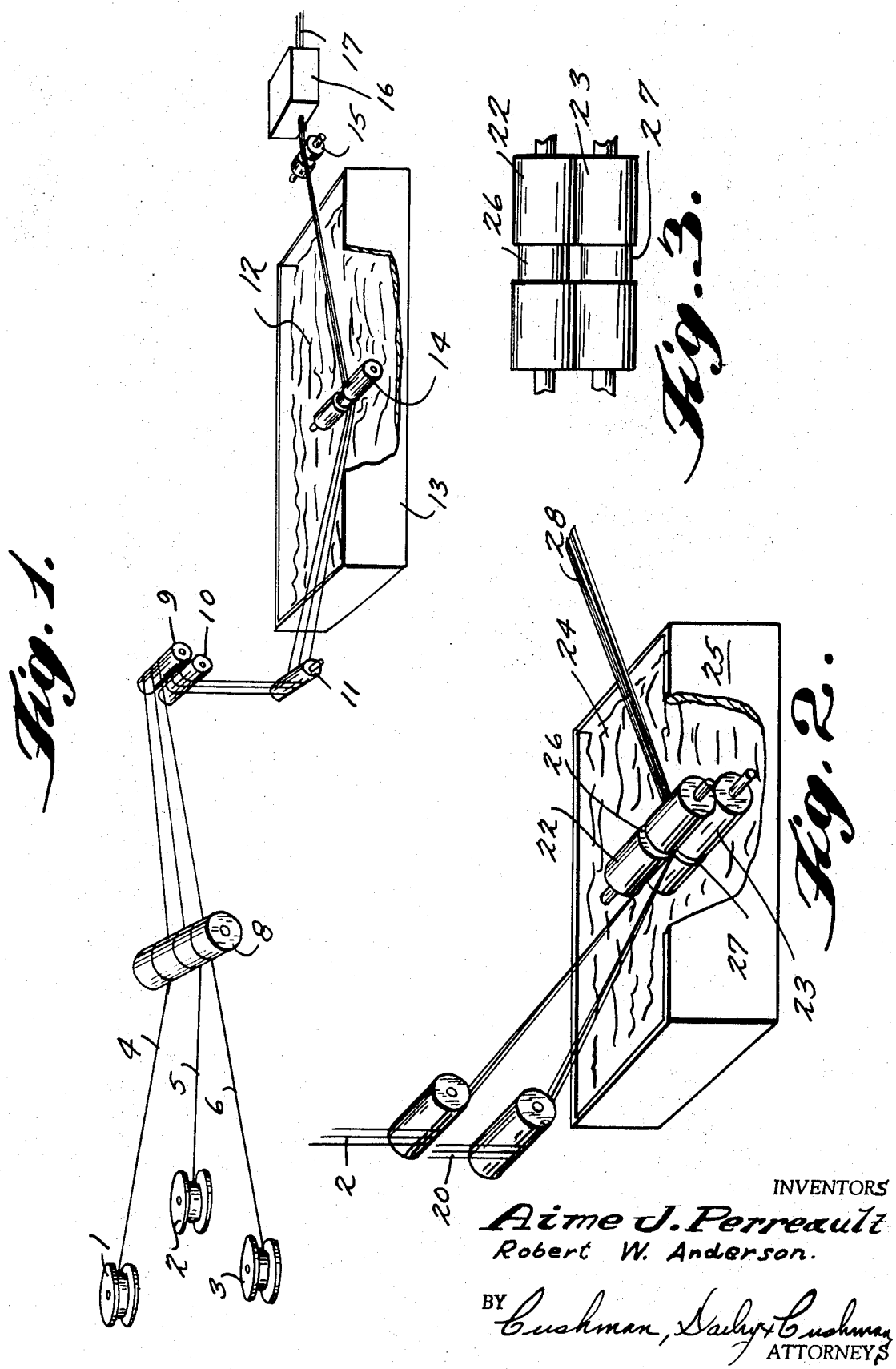

1

3,537,927
BONDING OF INSULATED WIRES TO FORM ELECTRICAL CABLES
Robert W. Anderson, Burlington, and Aime Joseph Perreault, South Burlington, Vt., assignors to Haveg Industries, Inc., Wilmington, Del., a corporation of Delaware
Filed July 2, 1968, Ser. No. 742,086
Int. Cl. H01b 13/16
U.S. Cl. 156—47                                 9 Claims

ABSTRACT OF THE DISCLOSURE

There is provided a process for forming bonded electrical cables by gathering continuous lengths of a plurality of plastic insulated wires into a substantially parallel adjacent spacial relationship and immersing the gathered wires into a heated liquid medium, which is maintained at a temperature sufficient to heat the plastic insulation to at least the lowest temperature at which bonding of the plastic insulation will occur. The heated wires are passed through a form of such dimensions that the wires are brought into a spacial relationship sufficient to at least partially press the outer portions of the plastic insulation of each wire with the other portions of the plastic insulation of adjacent wires, whereby bonding of the wires occurs.

---

The present invention relates to a process for bonding plastic insulated wires.

Insulated wires are bonded together to form ribbon cables, plied ribbon cables and the like for use where a plurality of insulated wires are required to run along a common course. Such bonded cables obviate the need for separate conduits, harness, etc., and further reduce the time necessary to install such cables as compared with the same installation using individual wires.

Bonded cables of this nature are produced in a variety of ways. One common method is to extrude an insulating plastic over electrical conducting wires as the wires pass through the die of an extruder. This method works well for bonding cables of only a few wires, but becomes difficult and troublesome to operate with more than three wires. Furthermore, an extrusion technique is most difficult, if not impossible to produce plied ribbon cables, i.e., a cable having more than one layer of wires, each of which layers have disposed therein more than one wire in a parallel configuration. Also, extrusion techniques are very difficult to operate when using certain polymers, most notably among which are the higher chlorinated and fluorinated polymers. Consequently, in the above-mentioned situations, the wires are normally individually covered with a plastic insulating material by any of the known techniques, e.g., extrusion, dipping, wrapping, spraying etc., and subsequently bonded together.

This latter technique is generally accomplished by bringing the individually insulated wires into lateral contact in one plane while passing the wires over heating devices such as rollers or platens, whereby they are bonded or sealed or welded together. This technique is used extensively in the art and can produce bonded cables at a reasonable rate. However, the operation of such a technique is not without difficulties. The heating devices must be rather closely controlled in temperature as well as speed of the wires crossing the heating device. Since the heat transfer from a heating device such as a roller or platen to insulated wires is somewhat slow, these heating devices must be maintained at a temperature considerably higher than the maximum temperature to which the plastic insulating material can be heated. Accordingly, the insulated wires must contact and the heating device in a period of time which is insufficient for the plastic insulated material to reach the maximum allowable temperature. However, the insulation material must be allowed to contact the heating device for a period of time sufficient to soften the material and cause the insulation of one wire to bond to the insulation of adjacent wires. For example, in the situation of a plastic insulating material A, the material must reach a temperature $T_{min.}$ in order to bond to adjacent wires of the same temperature. This temperature may be defined as the "tacky" point of the plastic insulating material. As is well known in the art, thermoplastic material decreases in hardness with increase in temperatures. When the temperature reaches the "tacky" point, two pieces of the thermoplastic pressed together will stick or adhere forming a bond. The "tacky" point for thermoplastics is well known in the art, but if there is any doubt, simply pressing together samples heated at various increasing temperatures will readily determine the "tacky" point. For most thermoplastics, acceptable temperatures are the same as the temperatures used in heat-sealing or welding the thermoplastic and these temperatures are easily obtained from standard textbooks. Stated more simply $T_{min.}$ is the lowest temperature at which bonding of the plastic insulating material will occur which is generally in the range of 150° F. to 450° F. for most plastics. If the material, however, reaches a temperature $T_{max.}$ it will become quite soft and unduly deform, causing a non-uniformly insulated wire and/or sticking to the heating device. $T_{max.}$ may be defined as the "deformation" temperature, i.e., that temperature at which the deformed polymer will not return to its pre-deformed shape after release of the deforming force and cooling. Accordingly, the material must be heated between a temperature $T_{min.}$ and $T_{max.}$. Of course, if the heating device temperature $T_D$ is much higher than $T_{max.}$, there must be a rather short contact time between the wires and the heating device in order that the temperature of the insulating material does not exceed $T_{max.}$. Conversely, as the heating device temperature $T_D$ approaches close to $T_{max.}$, there will be longer necessary contact times in order that the insulating material reaches a temperature of at least $T_{min.}$. While $T_D$ could be kept only slightly above $T_{max.}$, this would require huge rollers or platens because of the rather poor heat transfer between such heating devices and the insulating plastic material in order to allow a sufficient contact time at a reasonable rate of production, to heat the insulating material to between $T_{min.}$ and $T_{max.}$. Accordingly, for a practical operation, $T_D$ is substantially above $T_{max.}$ and the contact time must be constantly and very carefully controlled so that $T_D$ varies only a few degrees and the contact time varies only by small fractions of a second.

As appreciated by those skilled in the art, this careful control of the bonding operation is difficult to maintain and frequently the contact time and temperature of the heating device varies beyond the critical limits resulting in poor quality product and/or sticking. While the product must be carefully inspected and the poor quality product discarded as waste, which increases the overall cost of production, the sticking of the plastic insulation material to the heating device completely disrupts the process and requires shutdown and cleaning of the apparatus, and as such is a very serious problem. Generally, the art has attempted to solve the sticking problem by using a wide variety of anti-stick compositions on the heating devices. However, these anti-stick compositions must be periodically applied as they are removed by the wires passing thereover. Furthermore, the effectiveness of these anti-stick compositions is not fully satisfactory and each plastic insulating material requires its own anti-stick composition.

Accordingly, it is an object of this invention to provide a process for producing bonded cables which does not require critical control of the operating parameter. It is a further object of the invention to provide a process that eliminates the sticking of the plastic insulating material to the processing apparatus. It is also an object to provide a process which will produce bonded cable rapidly, with a minimum of supervision, and with substantially no waste. An additional object is to provide a process that is simple and easy to operate and will bond higher chlorinated and fluorinated polymers.

Broadly stated, the present inventor has discovered that the object of the invention may be accomplished by gathering continuous lengths of plastic insulated wires in a substantial parallel spacial relationship and immersing the gathered wires into a heated liquid medium maintained at a temperature above the lowest temperature at which bonding of the plastic insulation will occur. The heated gathered wires are then passed through a restricting form or device of such dimension that the wires are brought into a spacial relationship sufficient to at least partially press the outer portion of the insulating material of each wire with the outer portions of the insulating material of adjacent wires, whereby bonding will occur. While the restricting form or device may take any desired configuration, such as an orifice, apertured plate, converging cone, etc., it has been found that a grooved roll or rolls are especially useful in this regard.

The insulating materials useful in the present process may be any of the common and known electrical insulating thermoplastic polymers which will soften and become tacky when heated, e.g. polyvinyl chloride, polyvinyl alcohol or acetate, polyethylene, polypropylene, polybutene, poly 4-methyl pentene, polyamides, polyurethanes, polystyrene and styrene-butadiene rubbers, polyvinylidiene chloride and copolymers thereof with polyvinyl chloride, fluorinated polyethylene and polypropylene and copolymers thereof, polytrifluoroethylene, fluorinated ethylene-alkylene copolymers, e.g. alkylenes of up to 8 carbon atoms, such as the copolymers of tetrafluoroethylene and hexafluoropropylene (hereafter referred to as PFEP) and copolymers of vinylidene fluoride and hexafluoropropylene, and polytetrafluoroethylene (referred to hereafter as PTFE). Of special importance are the fluorinated polymers having the formula

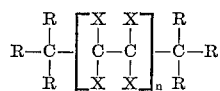

where R and X are hydrogen and/or lower alkyl, e.g. up to 4 carbon atoms, or halogen, e.g. chlorine or fluorine, but where at least two of the X positions are fluorine. While some of these fluorinated polymers are not true thermoplastics, for the purposes of this disclosure they are considered to be embraced by the term "thermoplastics."

The process will be further described in connection with the drawings, which are schematic illustrations of suitable embodiments of the process. FIG. 1 illustrates the process wherein a ribbon cable is produced. FIG. 2 shows the process for producing plied ribbon cables and FIG. 3 shows pressure devices useful therein.

Referring to FIG. 1 in detail, 1, 2 and 3 are payoff reels of wires 4, 5 and 6, respectively, having an insulating cover of plastic and/or rubber thereon. The wires 4, 5 and 6 pass around a gathering roll 8 which may, if desired, be two rolls suitably resulting in a "S" path through the nip of the rolls. The wires then pass around a second roll or set of rolls 9 and 10, which are illustrated as a "S" path set of rolls. The wires may further pass over a third set of rolls or roll 11. All three rolls and/or sets of rolls have individual wire receiving grooves to accomplish a gathering of the wires. The gathered wires pass into a heated liquid medium held in container 13 (shown partially broken away). The liquid medium may be heated in by conventional means, such as direct fired burners, recirculating heaters, electrical resistance heaters or steam heaters inside the container. The gathered wires pass around a grooved roll 14 which groove is wide enough to receive all the gathered wires in a close adjacent spacial relationship. The bonded wires pass out of heated medium 12 over take-off roll 15 and into a cooling and washing device 16 suitably having water sprays or a water bath therein. The bonded cable 17 exits from 16 to be dried, if desired, and reeled. As will be appreciated by those skilled in the art, the particular number and type of payout devices 1, 2 and 3 as well as the particular number and types of gathering rolls are unimportant so long as the wires are gathered to a close and parallel spacial relationship prior to entering the heated liquid medium. The submerged roll and/or rollers 14 (two or more may be used) has but a single groove for each set of gathered wires. Of course, more than one set of gathered wires may be passed through the apparatus at one time, e.g., a plurality of sets of payout reels and a plurality of sets of gathering and take-off rolls or a plurality of grooves for a plurality of gathered wire on a single set of gathering and take-off rolls. The groove and/or grooves in the submerged roll 14 must be so sized as to place the wires in a close adjacent spacial relationship, and preferably slightly pressed together. Accordingly, it is preferable that the groove have a width slightly less than the combined width of the heated plurality of gathered wires, e.g., 2% to 15% less, so that the wires are laterally compressed together.

A plurality of layers of gathered wires may be bonded together, if desired in a manner illustrated by FIG. 2. Two (or more) separate sets of gathered wires 20 and 21 are brought into a close lateral spacial relationship as in FIG. 1 described above. One set of gathered wires is disposed above and in a parallel relationship to a second set of gathered wires below the first set of wires. The two sets of wires pass through the nip of a set of grooved rolls 22 and 23 submerged in heated liquid medium 24 in container 25. Each of the rolls 22 and 23 have a matching groove 26 and 27 which grooves slightly press the two sets of gathered wires vertically together while also pressing each set of gathered wire laterally. FIG. 3 shows an end view of rolls 22 and 23 with grooves 26 and 27 in more detail. The opening of the grooved nip between the rolls is preferably sized to have a horizontal and vertical dimension slightly less than the combined width and thickness of the heated two sets of gathered wires, i.e., 2% to 15% less. Of course, as noted above, more than two sets of gathered wires may be used as well as more than one set of grooves and correspondingly more than one set of wires to be bonded together.

The heating medium may be any inert medium which can be heated to the required temperature without undue vaporization thereof or producing toxic fumes. Many organic liquids are suitable in this connection, including aliphatic hydrocarbons of $C_{12}$ and above, up to $C_{25}$ (e.g. dodecane, hexadecane, heptadecane), or the corresponding acids and salts (e.g. stearic acid, palmic acid and the alkali metal salts thereof). However, particularly suitable are chlorinated aromatics such as the biphenyls, examples of which are the Therminols marketed by Monsanto Chemical Corp., silicone fluids, an example of which is Silicone Fluid 1093 marketed by the General Electric Company, and inorganic salts. The inorganic salts, silicone fluids and chlorinated biphenyls are particularly useful in connection with bonding wires having a halogenated hydrocarbon polymer insulating material thereon, especially the inorganic salts.

Fluorinated polymers, such as polytrifluoroethylene, polychlorotrifluoroethylene, fluorinated ethylenepropylene polymers (PFEP) and polytetrafluoroethylene, are particularly difficult for producing bonded insulated wires. As is well known in the art, such insulated wire as produced by forming a paste, dispersion or the like of the fluorinated polymer on the metallic conductor and sintering the polymer. Since these polymers are not true thermoplastics, it is most difficult and exacting to heat the fluorinated polymer to the critical temperature where bonding will take place between adjacent wires and without the undesired occurrences, as noted above, and in addition, unwanted decomposition. Accordingly, an important feature of the invention is a process for bonding wires having a fluorinated polymer insulation thereon.

Inorganic salts have particular advantages, especially in connection with halogenated polymers, since they can be heated to the necessary high temperature without producing excessive vaporization and toxic fumes. For example, by varying the proportion of sodium nitrate, sodium nitrite and potassium nitrate and potassium nitrite, workable temperature ranges of between 300° F. to 1100° F. are readily obtainable. In comparison, the chlorinated biphenyls and silicone fluids have workable ranges of only about 50° F. to 700° F. and about 50° F. to 550° F., respectively. The above temperature ranges are workable ranges, taking into account vaporization rates, etc., as opposed to ultimate ranges which can be obtained. Further, when the salt mixture is water soluble, as is the case of the sodium and potassium nitrates and nitrites, any of the heating medium which clings to the bonded wires can be easily washed away by a subsequent cooling water spray, or bath. Further, the molten salts act as an excellent lubricant between the polymer and the rolls or other pressure devices, and almost completely eliminates any sticking therebetween. The chlorinated biphenyls and silicone fluids also act as lubricants, but do not have the advantage of being water soluble as do the salts.

When using halogenated polymers as the insulating material, the polymers should be partially or completely sintered or cured prior to bonding the wires together. Otherwise, the polymers will unduly deform and produce non-uniformly insulated wires.

As will be appreciated by those skilled in the art, the hot liquid heating medium will transfer heat to the plastic insulating material much faster than a metallic surface. Accordingly, only a very short length of liquid heating medium is necessary to heat the plastic insulating material of the parallel disposed wires to a temperature between $T_{min.}$ and $T_{max.}$, e.g., 1 to 5 feet, prior to being pressed together. Furthermore, since the plastic insulating material will be heated to substantially the same temperature as the liquid heating medium in this short distance, the temperature of the liquid heating medium can be closely controlled near $T_{min.}$ or $T_{max.}$ without fear of under or overheating the plastic material. Such control is well within the skill of the art using conventional controllers and heating systems. For example, with PTFE the temperature of the medium may be between 600° F. and 900° F., and 500° to 700° F. for PFEP.

The invention is illustrated by the following example, but it is to be understood that the invention is not limited to the example but is fully applicable to the extent disclosed in the foregoing.

EXAMPLE 1

Three wires having a partially sintered PTEF insulating material thereon were passed through the apparatus of FIG. 1. The wires were 30 AWG copper wire with a 0.005 inch of coating of PTEF thereon. The liquid medium was 7 parts sodium nitrate, 40 parts sodium nitrite, 50 parts potassium nitrate and 3 parts potassium nitrite, and heated to a temperature of 760° F. The grooved roller had a lateral groove dimension of .064 inch. The speed of the wires was 150 feet per minute. A total of 75 thousand feet of wires were produced with no sticking, deformed insulation or improper bonding. The same procedure and results were repeated with 30 AWG wires coated with .005 inch PFEP and using, at a temperature of 525° F., each of General Electric Silicone Fluid 1093 and Monsanto's Therminol F. R. (chlorinated biphenyls) instead of the salt composition.

It will be apparent that various modifications of the invention may be made without departing from the spirit and scope of the invention as disclosed above. Accordingly, these modifications are intended to form part of the invention and the invention is limited only by the scope and spirit of the annexed claims.

What is claimed is:

1. A process for forming bonded electrical cables comprising gathering continuous lengths of a plurality of plastic insulated wires into a substantially parallel adjacent spacial relationship, immersing the gathered wires into a heated liquid medium maintained at a temperature sufficient to heat the plastic insulation to at least the lowest temperature at which bonding of the plastic insulation will occur, passing the wires through a form of such dimensions that the wires are brought into a spacial relationship sufficient to at least partially press the outer portions of the plastic insulation of each wire with the outer portions of the plastic insulation of adjacent wires, whereby bonding of the wires occurs, and then cooling the so bonded wires.

2. The process of claim 1 wherein the plurality of gathered wires all lie in substantially one plane and are bonded to form a ribbon cable.

3. The process of claim 1 wherein the plurality of gathered wires lies in more than one plane and is bonded to form a plied ribbon cable.

4. The process of claim 1 wherein the said form is of such dimensions as to be 2% to 15% less than the dimensions of the gathered wires.

5. The process of claim 1 wherein the plastic insulation is a fluorinated polymer and the heated liquid medium is an inorganic salt composition.

6. The process of claim 1 wherein the said form is at least one grooved roll.

7. The process of claim 5 wherein the fluorinated polymer is polytetrafluoroethylene and the temperature of the inorganic salt is between about 600° F. and 900° F.

8. The process of claim 1 wherein the temperature of the heated liquid medium is below the deformation temperature of the polymer.

9. The process of claim 1 wherein the polymer is a copolymer tetrafluoroethylene and hexafluoropropylene and the temperature of the heated liquid medium is between 500° and 700° F.

References Cited

UNITED STATES PATENTS

| 2,425,294 | 8/1947 | Morgan | 156—47 X |
| 2,749,261 | 6/1956 | Hardison | 156—47 |
| 3,005,739 | 10/1961 | Lang et al. | 156—51 X |
| 3,158,181 | 11/1964 | Gore. | |

VERLIN R. PENDEGRASS, Primary Examiner

U.S. Cl. X.R.

156—55